United States Patent
Faeth et al.

(10) Patent No.: US 9,771,942 B2
(45) Date of Patent: Sep. 26, 2017

(54) EXHAUST GAS TURBOCHARGER HAVING GUIDING SCREEN RINGS THAT ARE ROTATABLE RELATIVE TO EACH OTHER

(71) Applicant: CONTINENTAL AUTOMOTIVE GMBH, Hannover (DE)

(72) Inventors: Holger Faeth, Fussgoenheim (DE); Ralf Boening, Reiffelbach (DE)

(73) Assignee: Continental Automotive GmbH, Hannover (DE)

( * ) Notice: Subject to any disclaimer, the term of this patent is extended or adjusted under 35 U.S.C. 154(b) by 394 days.

(21) Appl. No.: 14/381,271

(22) PCT Filed: Feb. 20, 2013

(86) PCT No.: PCT/EP2013/053316
§ 371 (c)(1),
(2) Date: Aug. 27, 2014

(87) PCT Pub. No.: WO2013/127664
PCT Pub. Date: Sep. 6, 2013

(65) Prior Publication Data
US 2015/0093236 A1 Apr. 2, 2015

(30) Foreign Application Priority Data
Feb. 27, 2012 (DE) .................. 10 2012 202 907

(51) Int. Cl.
*F04D 27/00* (2006.01)
*F01D 17/14* (2006.01)
(Continued)

(52) U.S. Cl.
CPC ........... *F04D 27/002* (2013.01); *F01D 17/14* (2013.01); *F01D 17/148* (2013.01); *F02C 6/12* (2013.01);
(Continued)

(58) Field of Classification Search
CPC . F01D 1/08; F01D 9/045; F01D 17/14; F01D 17/148; F04D 27/002
See application file for complete search history.

(56) References Cited

U.S. PATENT DOCUMENTS 5,372,485 A    12/1994    Sumser et al.
5,454,225 A    10/1995    Sumser et al.
(Continued)

FOREIGN PATENT DOCUMENTS

CN    101718227 A    6/2010
CN    101956606 A    1/2011
(Continued)

OTHER PUBLICATIONS

Skopil, Mario Arno, Moderne Turboaufladung, 2nd Edition, Rennigen, Expert Verlag 2007, p. 15, ISBN 978-3-8169-2721-1—Statement of Relevance.

*Primary Examiner* — Gregory Anderson
*Assistant Examiner* — Jason Davis
(74) *Attorney, Agent, or Firm* — Laurence A. Greenberg; Werner H. Stemer; Ralph E. Locher

(57) ABSTRACT

An exhaust gas turbocharger includes a turbine housing in which a turbine wheel and a guide apparatus that guides an exhaust gas flow to the turbine wheel are disposed. The guide apparatus has two guide grate or screen rings that are rotatable relative to each other and each of which have guide vanes or blades. Conically running flow channels tapering in the direction of the turbine wheel are formed between the guide grate rings.

9 Claims, 8 Drawing Sheets

(51) Int. Cl.
*F02C 6/12* (2006.01)
*F04D 17/10* (2006.01)

(52) U.S. Cl.
CPC .......... *F04D 17/10* (2013.01); *F05D 2220/40* (2013.01); *F05D 2250/232* (2013.01)

(56) References Cited

U.S. PATENT DOCUMENTS

| | | |
|---|---|---|
| 7,428,814 B2 | 9/2008 | Pedersen et al. |
| 2007/0209361 A1 | 9/2007 | Pedersen et al. |
| 2010/0196145 A1 | 8/2010 | Lombard et al. |
| 2012/0023936 A1 | 2/2012 | Kruiswyk et al. |

FOREIGN PATENT DOCUMENTS

| | | |
|---|---|---|
| DE | 91931 C | 8/1896 |
| DE | 2843202 A1 | 4/1980 |
| DE | 4238550 A1 | 5/1994 |
| DE | 4330487 C1 | 1/1995 |
| EP | 1433937 A1 | 6/2004 |
| EP | 2103793 A2 | 9/2009 |
| JP | 2009228479 A | 10/2009 |
| JP | 2009281337 A | 12/2009 |

FIG. 6A
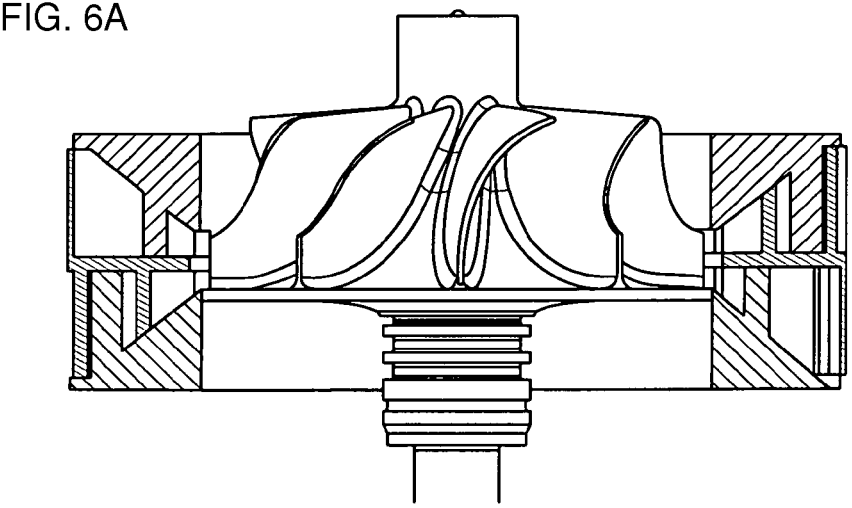
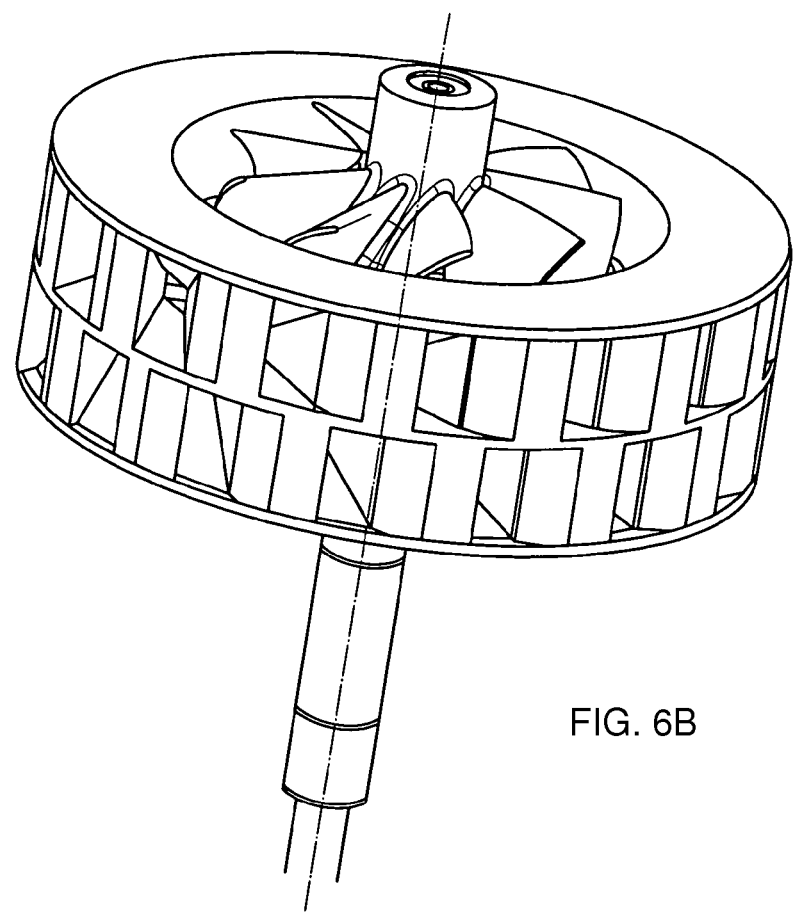
FIG. 6B

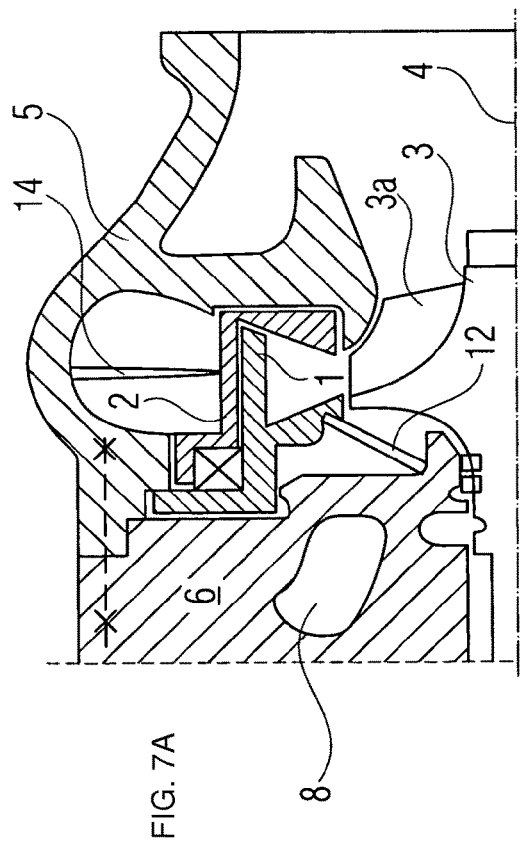
FIG. 7A
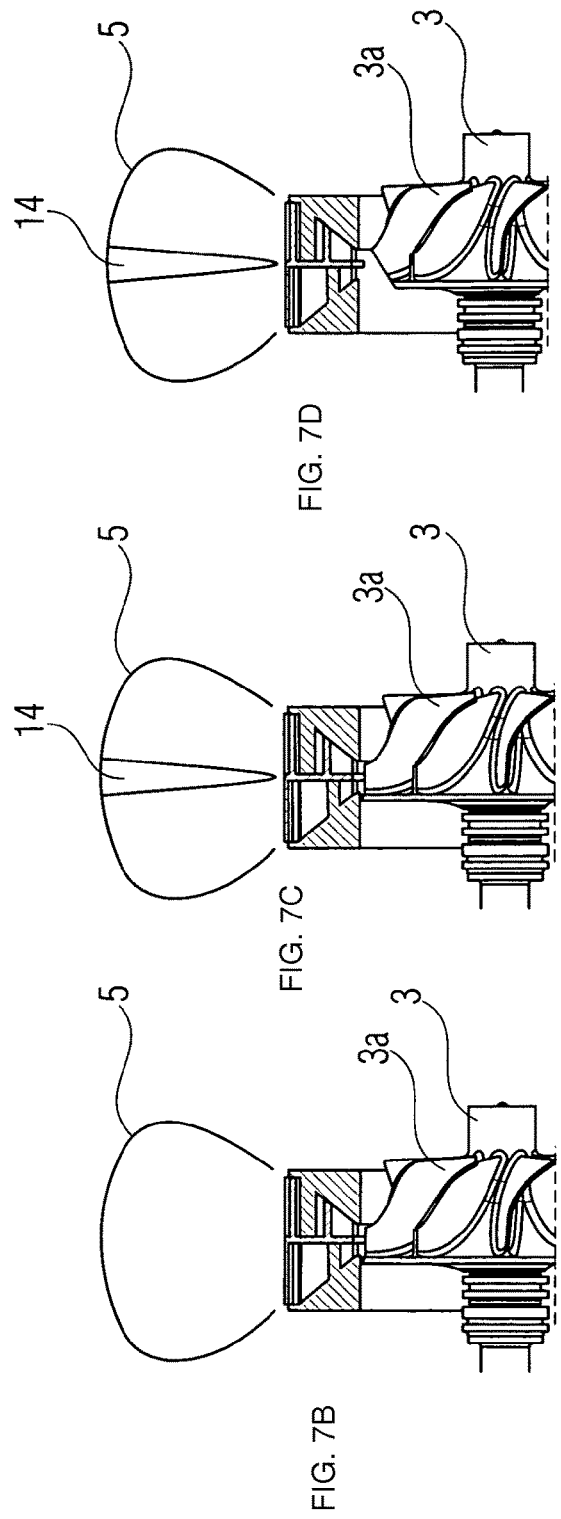
FIG. 7B
FIG. 7C
FIG. 7D

FIG. 8A
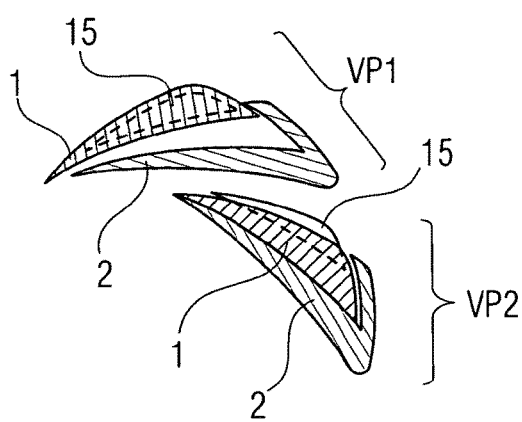
FIG. 8B
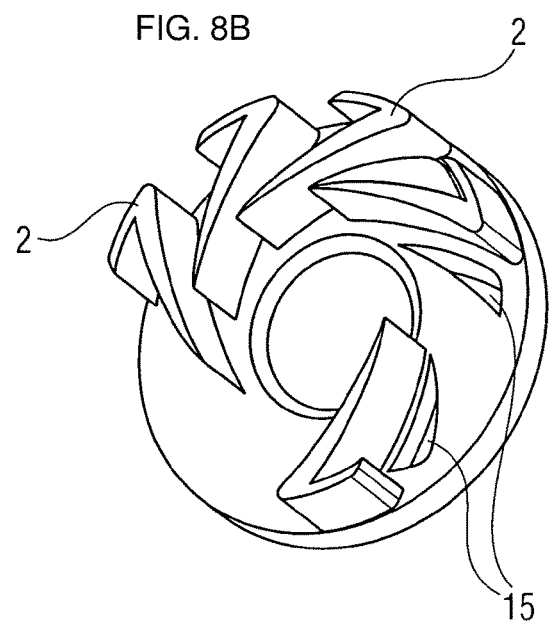
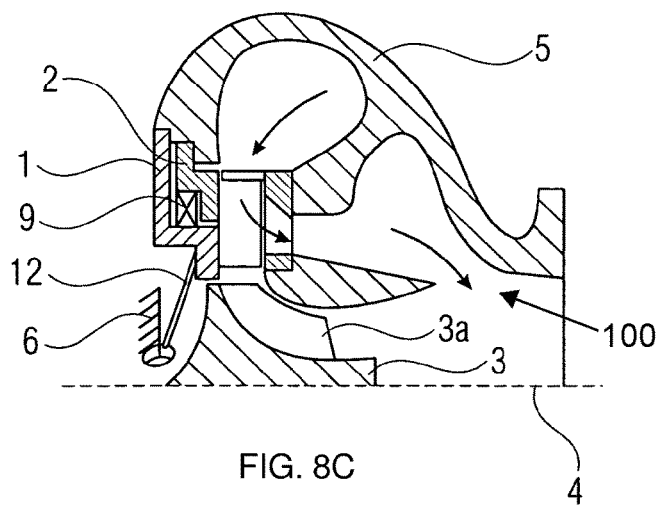
FIG. 8C

EXHAUST GAS TURBOCHARGER HAVING GUIDING SCREEN RINGS THAT ARE ROTATABLE RELATIVE TO EACH OTHER

BACKGROUND OF THE INVENTION

Field of the Invention

The invention relates to an exhaust-gas turbocharger having guide grate rings that are rotatable relative to one another.

Exhaust-gas turbochargers that have a variable turbine geometry (VTG) are already known. By means of a VTG of said type, the response behavior of an exhaust-gas turbocharger can be improved in relation to a conventional wastegate-type turbocharger.

One known embodiment of a VTG is the so-called rotary-vane type. In this, an adjustable guide grate is situated upstream of the turbine wheel, by means of which adjustable guide grate the inlet cross section and the inlet angle of the exhaust-gas flow conducted to the turbine wheel of the exhaust-gas turbocharger can be varied in continuous fashion. The guide grate has guide vanes which are each rotatably mounted, by means of a guide vane shaft, in a bore of a vane bearing ring. The guide vanes are normally fixedly connected to levers that engage into an adjustment ring that is coaxial with respect to the vane bearing ring. If the adjustment ring is rotated about the axis of the exhaust-gas turbocharger, then the guide vanes are, via the levers, adjusted with regard to the inflow angle to the turbine wheel. Furthermore, in the event of a rotation of the adjustment ring, the flow cross section of the exhaust-gas flow conducted to the exhaust-gas turbocharger also changes. It is thus possible for the exhaust gas in the turbine housing to be accelerated and supplied to the turbine wheel with greater kinetic energy. This type of VTG is used in particular in diesel engines. Said type of VTG is only seldom used in the case of Otto-cycle engines because it is associated with relatively high costs owing to the large number of parts and the requirement for material that is resistant to high temperatures. A further disadvantage of a rotary-vane-type VTG consists in that firstly the spacing between the vane trailing edges (flow-off edges) and the turbine wheel, and secondly the inflow angle to the turbine wheel, vary. As a result, an optimum impingement of flow on the turbine wheel vanes is only attained, at a maximum, at one operating point. The efficiency decreases to either side of said operating point. This impairs the thermodynamic efficiency of the exhaust-gas turbocharger.

In a further embodiment of a VTG, use is made of an axial slide. Said axial slide is arranged coaxially with respect to the axis of the exhaust-gas turbocharger and is movable relative to the turbine housing. Said movement of the slide results primarily in a variation of the inlet width of the exhaust-gas stream upstream of the turbine wheel. There are numerous variants of an axial slide, for example a combination of an axial slide with a two-channel turbine housing, an additional vane arrangement on the slide, and a slide which, when displaced, additionally opens a wastegate duct.

US 2010/0196145 A1 discloses a turbine device for an exhaust-gas turbocharger that has a VTG. Said VTG has two rings which are arranged coaxially with respect to one another, which are of continuous form in a circumferential direction and which can be rotated relative to one another in order to vary the inlet cross section for the exhaust-gas stream upstream of the turbine wheel. Said rotation additionally causes a variation of the exhaust-gas throughput through a wastegate duct. The rings are configured such that a form of aperture diaphragm is provided between adjacent elements, which is disadvantageous from a thermodynamic aspect. Furthermore, the obstruction posed by the flow cross section upstream of the turbine wheel is very substantial, which firstly limits the exhaust-gas throughput through the turbine wheel and secondly results in a non-uniform, abrupt impingement on the turbine wheel. This has an adverse effect on the thermodynamics and on the strength and durability of the turbine wheel.

BRIEF SUMMARY OF THE INVENTION

It is the object of the invention to specify an exhaust-gas turbocharger with a variable turbine geometry which has a relatively small number of parts and exhibits high thermal resistance.

Said object is achieved by means of an exhaust-gas turbocharger having the features specified below. Advantageous embodiments and refinements of the invention are specified in the dependent claims.

An exhaust-gas turbocharger according to the invention has a turbine housing in which there are arranged a turbine wheel and a guide apparatus that guides an exhaust-gas flow to the turbine wheel. The guide apparatus has two guide grate rings which are rotatable relative to one another and which each have guide vanes, between which guide grate rings there are formed conically running flow ducts that taper in the direction of the turbine wheel. It is achieved in this way that the exhaust-gas stream can be supplied to the turbine wheel via a flow guide through nozzle-like flow ducts which are formed by vane profiles and which taper in the direction of the turbine wheel. By means of said conical form of the flow ducts in the direction of the turbine wheel, the exhaust gas is accelerated in the direction of the turbine wheel. Said acceleration effect cannot be achieved in the case of the flow ducts being formed as aperture diaphragms.

It is preferable for one guide grate ring, which is fixed with regard to the inflow angle and which is equipped with guide vanes, to be arranged, coaxially with respect to the axis of rotation of the turbine wheel, so as to be fixed in terms of rotation and translation relative to the turbine wheel. The second guide grate ring, which is likewise equipped with guide vanes, is arranged coaxially with respect to the first guide grate ring and is mounted rotatably in the exhaust-gas turbocharger. In this way, a rotational adjustment of the second guide grate ring relative to the first guide grate ring is possible. Here, the guide vanes of one guide grate ring project into the intermediate spaces between the guide vanes of the second guide grate ring, and vice versa. In this way, a respective guide vane of the first guide grate ring forms, together with the adjacent vane of the second guide grate ring, a flow duct in which the exhaust-gas flow through the guide apparatus is guided to the turbine wheel at an angle that is defined by the curvature of the guide vanes. The end sections of the guide vanes in the direction of the turbine wheel can be positioned very close to the turbine wheel, whereby the efficiency of the inflow of the exhaust gas into the turbine wheel is increased.

It is preferable for one of the two guide grate rings to be equipped with guide vanes which extend further outward in the radial direction than the guide vanes of the second guide grate ring and which overlap the guide vanes of the second guide grate ring in the direction of rotation or circumferential direction.

If the first guide vane ring is now adjusted in the clockwise direction of rotation, the flow duct is increased in size.

In the event of an adjustment of the first guide vane ring in the other direction, the flow duct is reduced in size. The end positions of the adjustment are delimited in each case by the abutment of the guide vanes against one another.

One advantageous embodiment of the invention consists in the provision of control slots in one of the guide vane rings, which control slots, above a predefined exhaust-gas throughput through the turbine housing, are opened up as a result of further rotation of the rotatable guide grate ring. Said control slots are connected to the chamber downstream of the turbine wheel such that, similarly to the situation with a wastegate duct, some of the exhaust gas is conducted past the turbine wheel.

An alternative embodiment consists in a wastegate valve or a wastegate flap being actuated separately, for example with p2 regulation, that is to say the wastegate valve is actuated using the charge pressure p2 (pressure downstream of the compressor).

To permit the rotation of the rotatable guide grate ring, the latter may be rotatably mounted in the turbine housing and/or in the bearing housing of the exhaust-gas turbocharger. For the support of the forces that arise during operation, use is preferably made of a rolling bearing, which additionally also reduces the occurring friction. Said rotation of the rotatable guide grate ring is preferably realized by means of a lever mechanism and actuation imparted by an electric or pneumatic actuator.

The inflow of the exhaust gas to the turbine wheel may be oriented, as in a conventional VTG, in a radial direction, though may alternatively also be oriented semi-axially.

BRIEF DESCRIPTION OF THE SEVERAL VIEWS OF THE DRAWING

Further advantageous characteristics of the invention will emerge from the exemplary explanation thereof below on the basis of the figures, in which:

FIG. 6 is a sectional illustration and a perspective view showing a guide apparatus according to the invention, FIG. 7 shows diagrams illustrating further exemplary embodiments of the invention, and FIG. 8 shows diagrams illustrating an advantageous embodiment of the invention.

DESCRIPTION OF THE INVENTION

Figure 1:
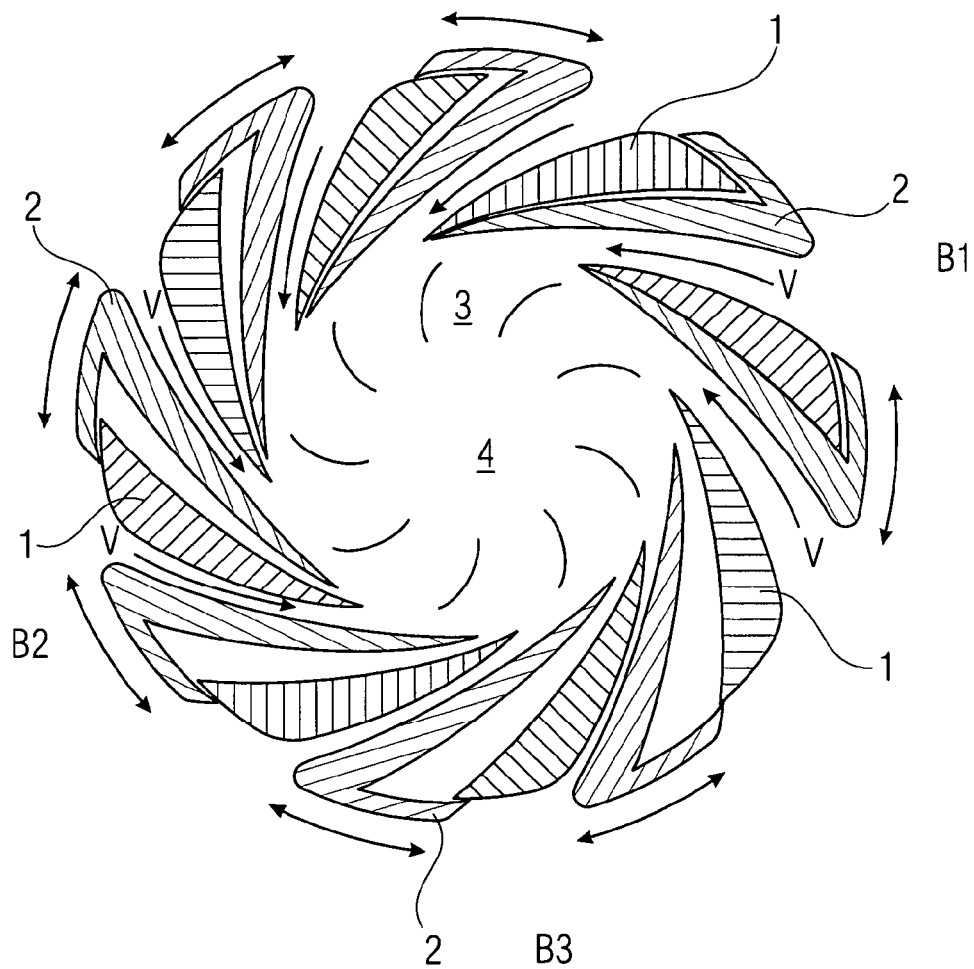
FIG. 1 shows a diagram illustrating two guide grate rings that are rotatable relative to one another.

FIG. 1 shows a diagram illustrating a guide apparatus which has two guide grate rings that are rotatable relative to one another and which is arranged in a turbine housing between the turbine housing and a turbine wheel that is rotatable about the turbocharger axis.

The first guide grate ring has guide vanes 1, and the second guide grate ring comprises guide vanes 2. Both guide grate rings are arranged coaxially with respect to the axis of rotation of the turbine wheel 3. The axis of rotation 4 of the turbine wheel is the turbocharger axis. The two guide grate rings are rotatable relative to one another in a circumferential direction, as indicated in FIG. 1 by double arrows. Furthermore, it can be seen from FIG. 1 that the guide vanes 2 of the second guide grate ring extend further outward in a radial direction than the guide vanes 1 of the first guide grate ring.

Different relative positions of the two guide grate rings that can be assumed in the event of a rotation of one of the two guide grate rings are illustrated in FIG. 1.

In the region B1 of FIG. 1, a relative position is shown in which the flow ducts are fully open. In said relative position, the radially outer region of the guide vanes 2 of the second guide grate ring fully overlaps the radially outer region of the guide vanes 1 of the first guide grate ring. The flow ducts permit a high exhaust-gas mass throughput.

In the region B2 of FIG. 1, another relative position is shown in which the flow ducts have a reduced opening cross section. In said other relative position, the radially outer region of the guide vanes 2 of the second guide grate ring partially overlaps the radially outer region of the guide vanes 1 of the first guide grate ring.

In the region B3 of FIG. 1, a further relative position is shown in which the flow ducts are closed. In said further relative position, the path of the exhaust-gas stream to the turbine wheel is blocked.

It is consequently possible, by controlling the relative position of the two guide grate rings with respect to one another, for the flow rate of the exhaust gas passing through the guide apparatus to the turbine wheel to be adjusted as required in the respective situation.

It is preferable for one of the two guide grate rings to be arranged, coaxially with respect to the axis of rotation of the turbine wheel, so as to be fixed in terms of rotation and translation relative to the turbine wheel, and the second guide grate ring is likewise arranged coaxially with respect to the axis of rotation of the turbine wheel, but is mounted so as to be rotatable relative to the first guide grate ring.

The guide vanes of the first guide grate ring project into the intermediate spaces between the guide vanes of the second guide grate ring. The flow ducts are formed in each case between two adjacent guide vanes of the first and the second guide grate ring.

In one embodiment, in the event of a clockwise rotation of one of the two guide grate rings, the cross section of the flow ducts is increased in size, and in the event of a counterclockwise rotation of said guide grate ring, the cross section of the flow ducts is reduced in size.

In an alternative embodiment, in the event of a clockwise rotation of one of the two guide grate rings, the cross section of the flow ducts is reduced in size, and in the event of a counterclockwise rotation of said guide grate ring, the cross section of the flow duct is increased in size.

In one advantageous embodiment of the invention, the end positions of the rotation of the two guide grate rings relative to one another are delimited by the abutment of the guide vanes of the two guide grate rings against one another.

Figure 2:
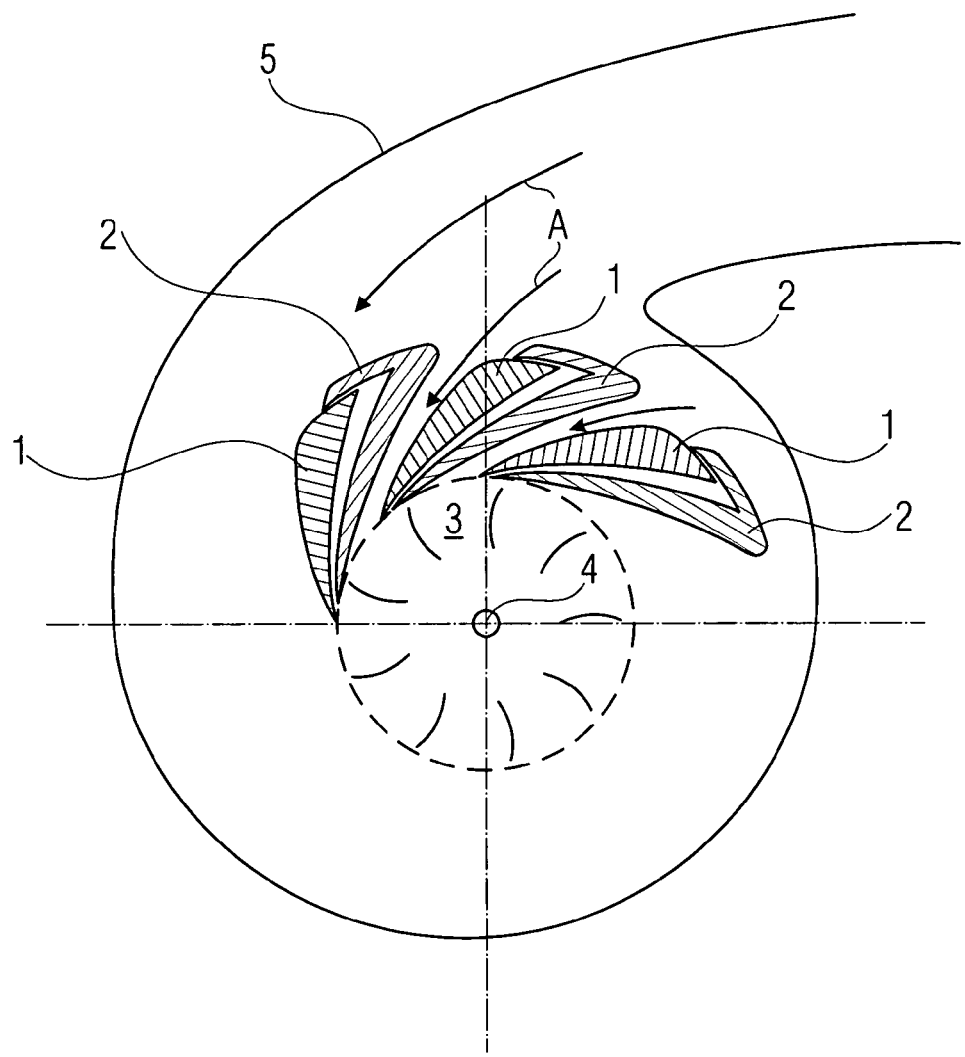
FIG. 2 shows a diagram illustrating the inflow to the guide grate rings through the turbine housing.

FIG. 2 shows a diagram illustrating the inflow to the guide grate rings through the turbine housing. In said diagram, for simplicity, only three guide vanes 1 of the first guide grate ring and three guide vanes 2 of the second guide grate ring are illustrated. As can be seen from FIG. 2, the exhaust-gas stream A enters the spiral-shaped turbine housing 5 and is guided in the direction of the turbine wheel 3 through the substantially open flow ducts of the guide apparatus composed of the two guide grate rings, the exhaust-gas stream driving said turbine wheel.

Figure 3:
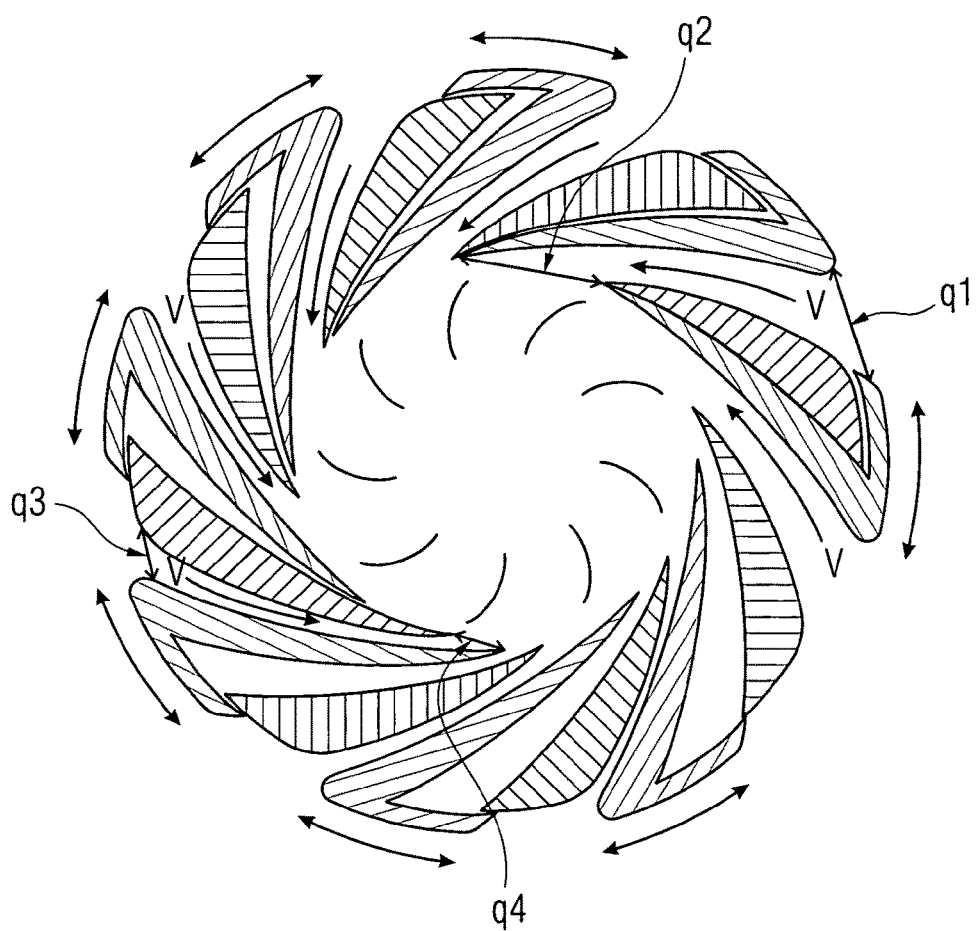
FIG. 3 shows a diagram illustrating the flow ducts in the case of known guide grate rings.

FIG. 3 shows a diagram illustrating the flow ducts in the case of known guide grate rings. It can be seen from FIG. 3 that, regardless of whether the flow ducts are fully or only partially open, the opening cross section of the respective flow duct in the radially outer end region of the guide apparatus corresponds in each case to the opening cross section of the same flow duct in the radially inner end region of the guide apparatus.

Accordingly, in the case of fully open flow ducts, the following relationship applies:

$$q1=q2$$

where q1 is the opening cross section of the respective flow duct in the radially outer end region of the guide apparatus and q2 is the opening cross section of the respective flow duct in the radially inner end region of the guide apparatus.

In the case of partially open flow ducts, the following relationship applies:

$$q3=q4$$

where q3 is the opening cross section of the respective flow duct in the radially outer end region of the guide apparatus and q4 is the opening cross section of the respective flow duct in the radially inner end region of the guide apparatus.

Furthermore, the following relationship applies:

$$q1>q3.$$

Owing to the constant opening cross section of the flow ducts in each case, that is to say the corresponding spacing in each case between the adjacent guide vanes that form the opening cross section, there is merely a gap flow. An acceleration of the exhaust-gas stream in the direction of the turbine wheel does not occur in the guide apparatus.

To achieve such an acceleration of the exhaust-gas stream in the direction of the turbine wheel, it is provided in the case of an exhaust-gas turbocharger according to the invention that the guide grate rings are designed such that, between them, there are formed conically running flow ducts that taper in the direction of the turbine wheel.

Figure 4:
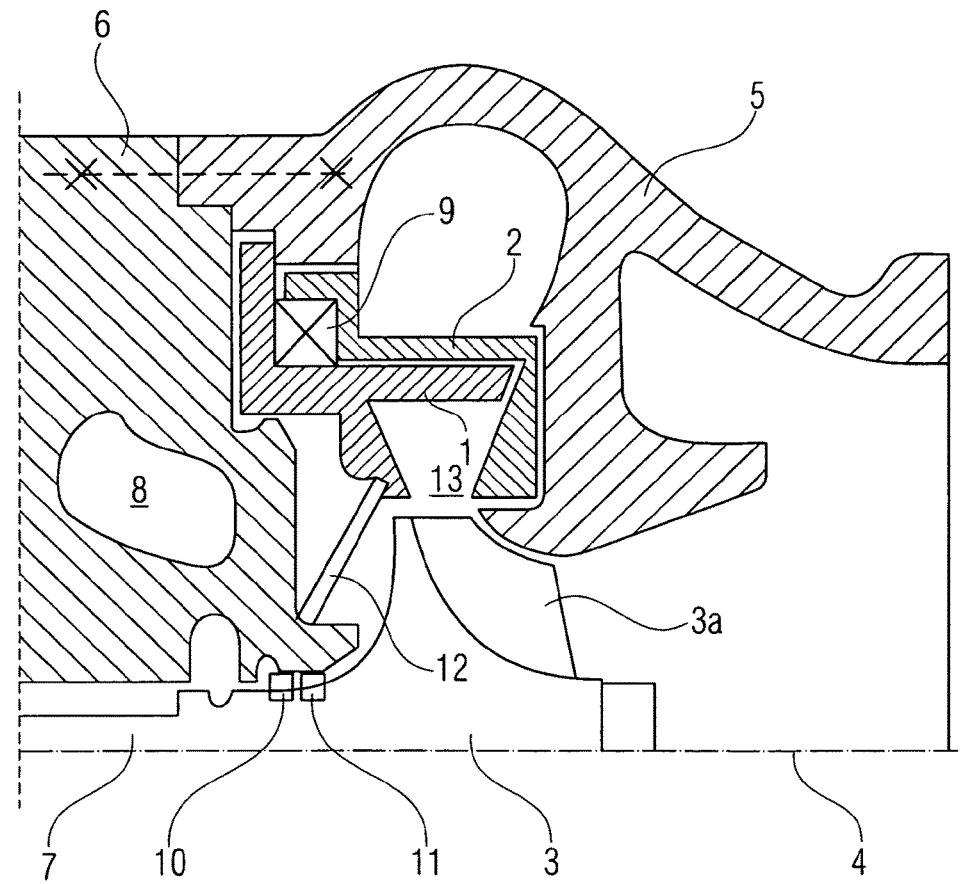
FIG. 4 shows a diagram illustrating a first exemplary embodiment of the invention.

This will be explained in more detail below on the basis of FIG. 4, which shows a diagram illustrating a first exemplary embodiment of the invention. Said diagram is a cross-sectional illustration of a sub-region of an exhaust-gas turbocharger. Said exhaust-gas turbocharger has a turbine housing 5 which is connected to the bearing housing 6 of the exhaust-gas turbocharger. A water core 8 provided for cooling purposes is formed in the bearing housing 6. In the turbine housing 5, a turbine wheel 3 that is equipped with turbine vanes 3a is connected rotationally conjointly to a turbocharger shaft 7. The axis of rotation 4 of the turbine wheel corresponds to the turbocharger axis. Seals 10 and 11 are provided between the bearing housing 6 and the turbine wheel 3. Furthermore, a heat shield 12 is positioned between the bearing housing 6 and a first guide grate ring of the guide apparatus, wherein said heat shield 12 is inserted into a groove of the guide vane 1, shown in FIG. 4, of the first guide grate ring. Furthermore, the guide apparatus comprises a second guide grate ring, one guide vane 2 of which is illustrated in FIG. 4. A bearing arrangement 9 is provided between the guide vanes 1 and 2 shown in FIG. 4.

According to the present invention, the guide vanes 1 and 2 are designed such that in each case conically running flow ducts 13 that taper in the direction of the turbine wheel 3 are formed between said guide vanes and thus between the two guide grate rings. In this way, it is achieved that the exhaust-gas stream is supplied to the turbine wheel, and accelerated in the direction of the turbine wheel, via a flow guide formed by nozzle-like flow ducts which are formed by vane profiles and which taper in the direction of the turbine wheel.

Figure 5:
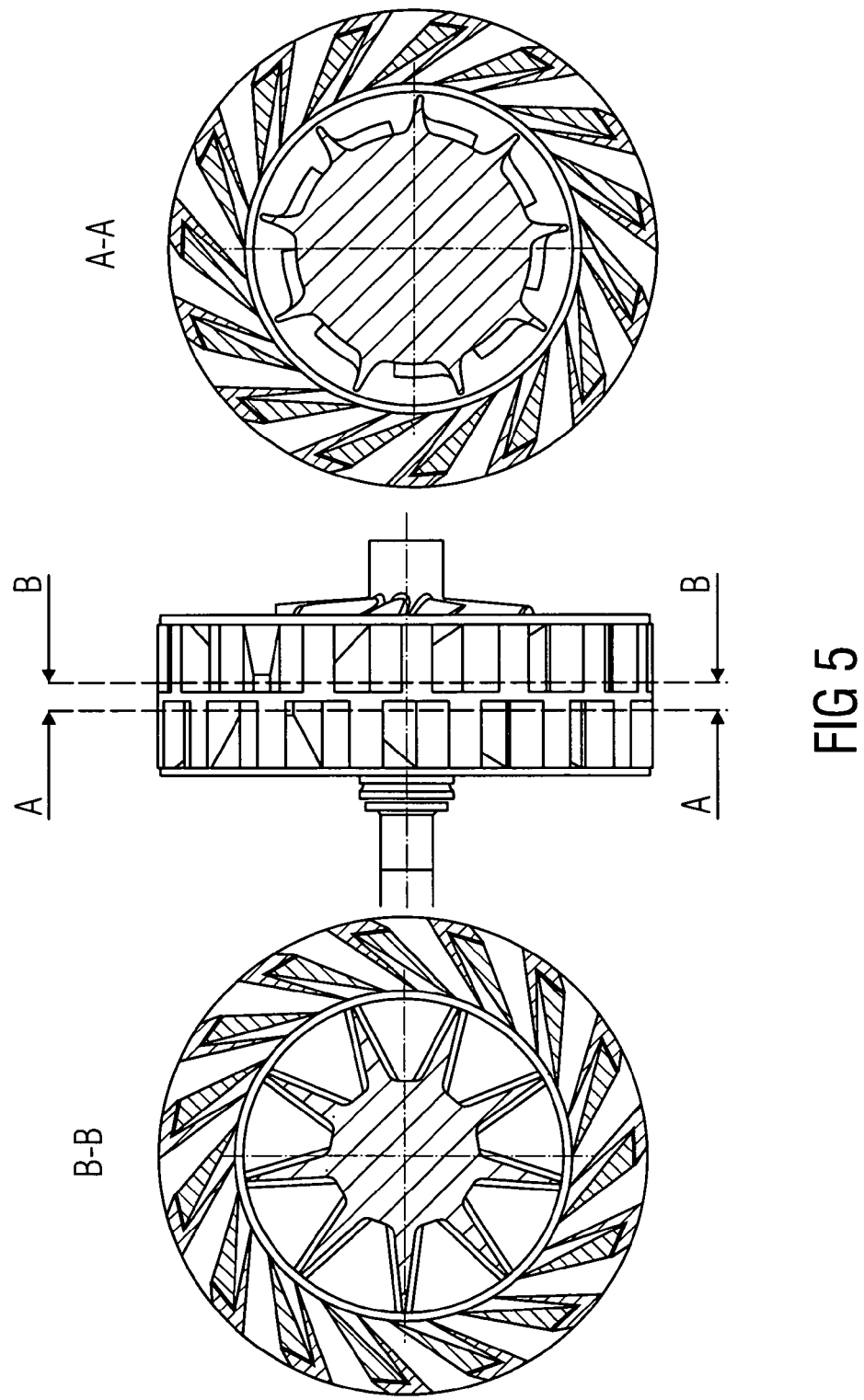
FIG. 5 is an illustration showing a uniform impingement of the exhaust gas on the turbine wheel.

FIG. 5 shows schematic illustrations for illustrating the open position of the flow ducts. Here, the central illustration shows a schematic side view, with a sectional illustration in the direction of the section line B-B being shown on the left-hand side, and a sectional illustration in the direction of the section line A-A being shown on the right-hand side.

It can be seen that obstructing parts of the circumference of the guide grate ring and flow-passage parts of the circumference of the guide grate ring are present in an alternating arrangement. The flow from the turbine housing is divided in half, with half flowing through duct A and half flowing, offset in the circumferential direction, through duct B. In this way, the turbine wheel is impinged on uniformly by the exhaust gas via duct A and duct B.

FIG. 6a shows a sectional illustration, and FIG. 6b shows a perspective view, illustrating a guide apparatus according to the invention. The inflow through the conical ducts can be seen from said illustrations.

FIGS. 7A-7D show diagrams illustrating further exemplary embodiments of the invention.

It can be seen from FIG. 7a that the subject matter of the present invention can also be used in the case of a turbine housing 5 equipped with a partition 14. Said embodiment is a so-called twin-scroll single VTG.

It can be seen from FIG. 7b that the subject matter of the present invention can also be used in the case of a so-called mono-scroll double VTG. A mono-scroll double VTG of said type is distinguished by the fact that the guide apparatus generates an inflow to the turbine wheel that is more uniform in the circumferential direction (cf. also FIG. 5).

It can be seen from FIG. 7c that the subject matter of the present invention can also be used in the case of a twin-scroll double VTG. A twin-scroll double VTG of said type differs from the mono-scroll double VTG shown in FIG. 7b in that the turbine housing 5 is equipped with a partition 14.

The variant shown in FIG. 7d is a twin-scroll double VTG with an RAAX turbine wheel, in which the exhaust gas flows diagonally through the turbine wheel. Here, the partition of the guide apparatus may also run at a non-90° angle with respect to the turbocharger axis.

FIGS. 8A-8C show diagrams illustrating an advantageous embodiment of the invention in which one of the guide grate rings has control slots 15 which, above a predefined exhaust-gas throughput through the turbine housing, are opened up as a result of further rotation of the rotatable guide grate ring. The control slots 15 are connected to the chamber downstream of the turbine wheel such that some of the exhaust gas is conducted past the turbine wheel.

Here, at the top right of FIG. 8a, a rotational position VP1 is shown in which a control slot 15 provided on the second guide grate ring is completely covered by a guide vane 1 of the first guide grate ring, such that the control slot is closed and no exhaust gas is conducted past the turbine wheel. In the middle at the right-hand side of FIG. 8a, a rotational position VP2 is shown in which a control slot 15 provided on the second guide grate ring is opened up, such that exhaust gas is conducted through said control slot into the chamber downstream of the turbine wheel without impinging on the turbine wheel.

In FIG. 8b, it is shown that the second guide grate ring, which has guide vanes 2, also comprises the control slots 15 which are already shown in FIG. 8a.

FIG. 8C shows a cross-sectional illustration showing an open control slot 15. The arrows shown in FIG. 8C indicate that the exhaust gas supplied to the turbine housing 5 is conducted through the open control slot 15, past the turbine wheel 3, into the chamber downstream of the turbine wheel, and out through the opening 100 in the turbine housing 5.

In the case of a guide apparatus having the features according to the invention, by contrast to an exhaust-gas turbocharger whose guide apparatus has an axial slide, it is the case that the inlet width of the exhaust-gas stream is not varied during the operation of the exhaust-gas turbocharger. This results in an improved inflow to the turbine wheel and thus improved thermodynamics.

By contrast to a rotary-vane-type VTG, the spacing of the guide vane trailing edges and the inflow angle to the turbine wheel do not change during operation. This has the advantage of directed flow guidance over a greater distance to the turbine wheel, and improved thermodynamics, because even when the rotary slide is closed, the vane trailing edges end very close to the turbine wheel.

By contrast to the above-mentioned rotary-slide-type VTG, the obstruction of the flow cross section in the open position, and thus the screening of individual flow chambers between two adjacent turbine wheel vanes, are reduced owing to the vane-like form of the guide grate rings. This leads to a considerable increase in the thermodynamic efficiency of the exhaust-gas turbocharger and to a more uniform impingement of the exhaust gas on the turbine wheel, and thus to reduced vibration excitation of the turbine wheel vanes.

To prevent non-uniform impingement on the turbine wheel in an open or partially open position, the guide apparatus may have two guide devices which are rotationally offset with respect to one another in the direction of rotation and which are preferably relatively narrow in the axial direction and in which vanes are arranged on both sides of the central vane ring, that is to say in the direction of the turbine housing and in the direction of the bearing housing, which vanes interact with two guide grate rings that are equipped with vanes in each case on one side. The vanes may be attached perpendicularly or obliquely to the guide grate rings. A more uniform impingement of the exhaust gas on the turbine wheel is obtained in the case of an oblique attachment.

Furthermore, a two-channel VTG that utilizes the pulsation of the exhaust gas may be implemented in a relatively simple manner by virtue of said guide grate arrangement simply being mirrored, that is to say by virtue of the exhaust gas from each channel of the turbine housing being guided through one half of the guide grate to a point close to the turbine wheel. The throughput through each channel can be made different by means of a variation of the guide grate geometry. Through the use of a rotary slide, it is possible for a VTG for a turbine wheel with diagonal inflow (RAAX) to be realized in a very simple manner.

In the case of a rotary-slide-type VTG used in a diesel application, the regulation of the turbine can be utilized to regulate the exhaust gas recirculation rate in an engine with an exhaust-gas recirculation system. A further advantage consists in the realization of engine braking operation without the use of an additional exhaust-gas flap (in the "rotary slide closed" position).

By means of a design with control slots for a wastegate function, it is possible to use a relatively small turbine wheel with relatively small mass moment of inertia and improved response behavior.

If a rotary slide is used, the number of parts of the VTG can be reduced considerably, which, in particular in Otto-cycle engine applications, leads to a cost saving and also to a more robust construction.

The invention claimed is:

1. An exhaust-gas turbocharger, comprising:
a turbine housing formed with a hole therein;
a turbine wheel disposed in said turbine housing; and
a guide apparatus disposed in said turbine housing and configured to guide an exhaust-gas flow to said turbine wheel, said guide apparatus having a first grate ring and a second grate ring configured to rotate relative to one another;
said first grate ring and said second grate ring each having guide vanes and said first grate ring and said second grate ring forming conically running flow ducts therebetween tapering in direction of said turbine wheel;
one of said first grate ring and said second grate ring having control slots configured to conduct a part of an exhaust-gas stream therethrough past said turbine wheel and to said hole in said turbine housing.

2. The exhaust-gas turbocharger according to claim 1, wherein:
said turbine wheel has an axis of rotation;
said first grate ring is fixedly disposed coaxially with respect to said axis of rotation of said turbine wheel; and
said second grate ring is disposed coaxially with respect to said axis of rotation of said turbine wheel and mounted to be rotatable relative to said first grate ring.

3. The exhaust-gas turbocharger according to claim 1, wherein:
said guide vanes of said second grate ring have intermediate spaces therebetween;
said guide vanes of said first grate ring project into said intermediate spaces between said guide vanes of said second grate ring; and
said flow ducts tapering in direction of said turbine wheel are formed between respectively adjacent guide vanes of said first grate ring and said second grate ring.

4. The exhaust-gas turbocharger according to claim 1, wherein:
said guide vanes of one of said first grate ring and said second grate ring extend further outward in a radial direction than said guide vanes of the other of said first grate ring and said second grate ring;
said guide vanes of said one of said first grate ring and said second grate ring partially outwardly overlap said guide vanes of said other one of said first grate ring and said second grate ring in the radial direction when said flow ducts are partially open; and
said guide vanes of said one of said first grate ring and said second grate ring fully outwardly overlap said guide vanes of said other one of said first grate ring and said second grate ring in radial direction when said flow ducts are fully open.

5. The exhaust-gas turbocharger according to claim 1, wherein said flow ducts have cross sections increasing in size in the event of a clockwise rotation of one of said first grate ring and said second grate ring and decreasing in size in the event of a counterclockwise rotation of said one of said first grate ring and said second grate ring.

6. The exhaust-gas turbocharger according to claim 1, wherein said flow ducts have cross sections increasing in size in the event of a counterclockwise rotation of one of said first grate ring and said second grate ring and decreasing in size in the event of a clockwise rotation of said one of said first grate ring and said second grate ring.

7. The exhaust-gas turbocharger according to claim 1, wherein said first grate ring and said second grate ring have end positions of rotation relative to one another being delimited by an abutment of said guide vanes of said first grate ring and said guide vanes of said second grate ring against one another.

8. The exhaust-gas turbocharger according to claim 1, wherein said first grate ring and said second grate ring are part of a two-channel guide grate, and exhaust gas is guided from said turbine housing to said turbine wheel through a respective part of each of said first grate ring and said second grate ring.

9. The exhaust-gas turbocharger according to claim 1, wherein said guide apparatus is configured to cause said turbine wheel to be impinged on by a flow diagonally or with an axial component.

* * * * *